United States Patent [19]

Van Ginhoven

[11] 4,327,542
[45] May 4, 1982

[54] ROW CROP HARVESTER WITH SELF-CLEANING BELT FEED

[75] Inventor: Robert M. Van Ginhoven, Lancaster, Pa.

[73] Assignee: Sperry Corporation, New Holland, Pa.

[21] Appl. No.: 252,098

[22] Filed: Apr. 8, 1981

[51] Int. Cl.³ ............................................. A01D 45/02
[52] U.S. Cl. ......................................... 56/98; 56/119; 198/494
[58] Field of Search ................. 56/98, 119, 14.5, 14.3; 198/494, 484

[56] References Cited

U.S. PATENT DOCUMENTS

| | | | |
|---|---|---|---|
| 3,940,913 | 3/1976 | Wallenfang et al. | 56/98 |
| 4,048,792 | 9/1977 | Shriver et al. | 56/98 |
| 4,223,846 | 9/1980 | Priephe et al. | 241/60 |

*Primary Examiner*—Jay N. Eskovitz
*Attorney, Agent, or Firm*—James R. Bell; Frank A. Seemar

[57] ABSTRACT

A row crop harvester provided with pairs of coacting power-driven endless belts having a feed path therebetween for stalk-type crop material to be fed by said belts to the harvester from the cutting mechanism thereon, the belts having lug members on the outer surfaces to effect positive engagement with crop material and move it along said feed path, and positive drive for said belts being provided in the form of spaced lugs on the inner surfaces of said belts which are received in complementary openings in rotary support and drive members, the improvement comprising self-clearing members supported adjacent the rotary members and having lugs projectable into the aforementioned openings to clear the same of any extraneous material therein.

10 Claims, 3 Drawing Figures

ROW CROP HARVESTER WITH SELF-CLEANING BELT FEED

BACKGROUND OF THE INVENTION

The present invention relates generally to harvesters, and more particularly, to those especially intended to cut cornstalks and gather them with endless chains or belts.

Harvesters have been developed heretofore to harvest stalk-type crops, such as corn, and to insure positive feed of the stalk crop material to the housing of the harvester for further operations after cutting the stalks, various types of chain-type means have been provided on harvesters along opposite sides of paths for the crop stalks and extend rearwardly of the cutting means to engage the cut stalks and move them to such additional operating means in the harvester. Chain feeding means of this type have been rendered more efficient by providing lugs on the chains which move along guide means extending along opposite sides to the path for the stalks. Other positive feeding means of the foregoing type developed heretofore have included rotatable lugged means which are positively driven, and endless belts having spaced lugs thereon, in lieu of chains.

A limitation of the foregoing is that no known feeding means universally provides a positively driven belt which is self-cleaning and which compensates for varying crop width.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the invention this is accomplished by providing a row crop harvester with self-cleaning belt feed including a mobile frame having a cutterhead. Crop receiving paths are defined and extend rearwardly from the cutterhead to guide cut crop material rearwardly. Pairs of coacting endless flexible feed belts extend along the crop receiving paths and have spaced, positive crop engaging configurations on the outer surfaces thereof and spaced drive lugs on the inner surfaces thereof. Pairs of rotary belt support and drive members are mounted respectively adjacent opposite end portions of said paths and around which the belts extend. A power source is connected to drive the belt supports. Complementary co-engaging configurations on the surface of the rotary members receive the drive lugs to effect positive drive of the belts. Self-cleaning members for the complementary configurations of the rotary members are operable to clear away any extraneous material accumulated in the rotary members.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DETAILED DESCRIPTION OF THE PREFERRED EMBODIMENTS

Figure 1:
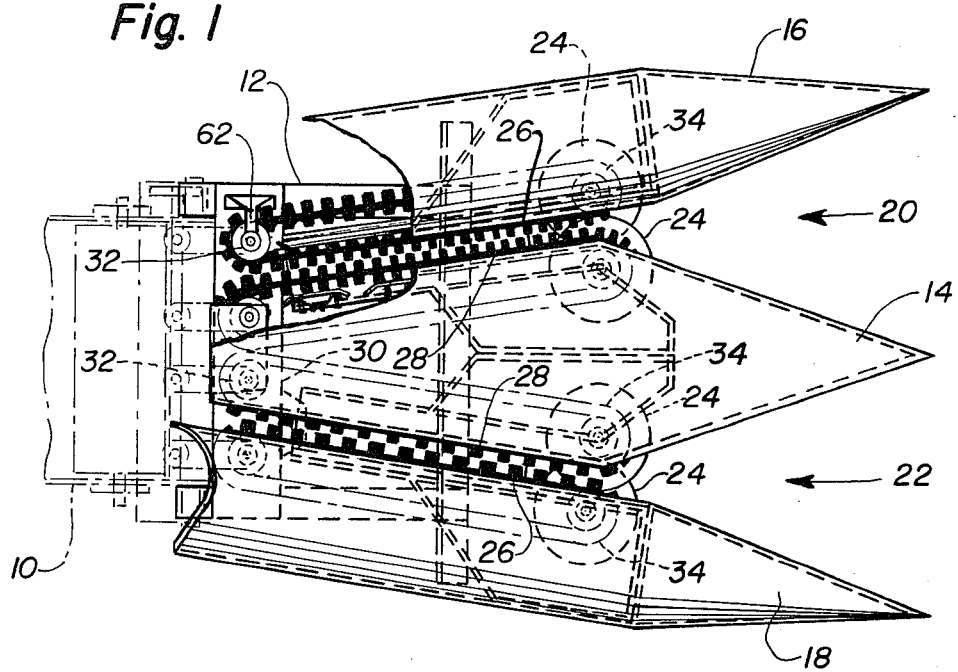
FIG. 1 is a fragmentary plan view of a harvester row crop header comprising the forward portion of a harvester, partly illustrated in phantom, and partly broken away to illustrate details of the portion comprising the present invention.

Referring to FIG. 1, there is illustrated therein, fragmentarily and in phantom, a forward portion 10 of a conventional row crop harvester from which there extends a frame 12, somewhat flexibly connected to the forward portion 10 of the harvester, for purposes of permitting the frame 12 to generally follow the contour of the field surface in which the harvester is operating. Supported upon the frame 12 is a central, pointed guide and gathering member 14, which is somewhat in the nature of a shroud and, flanked on opposite sides thereof are two similar pointed guide and gathering members 16 and 18, which cooperate with the central member 14 to define therebetween a pair of guide channels 20 and 22, spaced apart a distance equal to the separation of rows of crop material to be harvested by the harvester 10.

It is conventional in harvesters of this type to provide, near the forward end thereof, some means to cut the stalk-like row crop material and at least for exemplary purposes, the present illustration includes coacting pairs of cutting discs 24, which are power-driven by chains or belts of conventional type in harvesters of this type, the drive means usually being actuated by a diesel motor or otherwise, not shown, or, is the harvester is mounted on the forward end of a tractor, the power means is derived from a PTO of conventional type on the harvester.

The present invention primarily is concerned with means to positively feed the cut crop material, usually of a stalk nature of which corn is a typical example, and move the same along the guide channels 20 and 22 for further treatment or operations by the harvester 10, such as for purposes of chopping the material into suitable form for blowing it into a silo or otherwise, such description, however, being for exemplary purposes only. The present invention utilizes, with respect to each guide channel, a pair of endless lugged belts 26 and 28, which are best shown fragmentarily at least, but in large scale, in FIG. 2. Said belts are formed from a durable rubber composition of a type now frequently used in other elements of harvesters, combines and the like, and in certain instances, the same is reinforced by fabric layers or strips of high tensile strength vulcanized within the interior of the belts.

Figure 3:
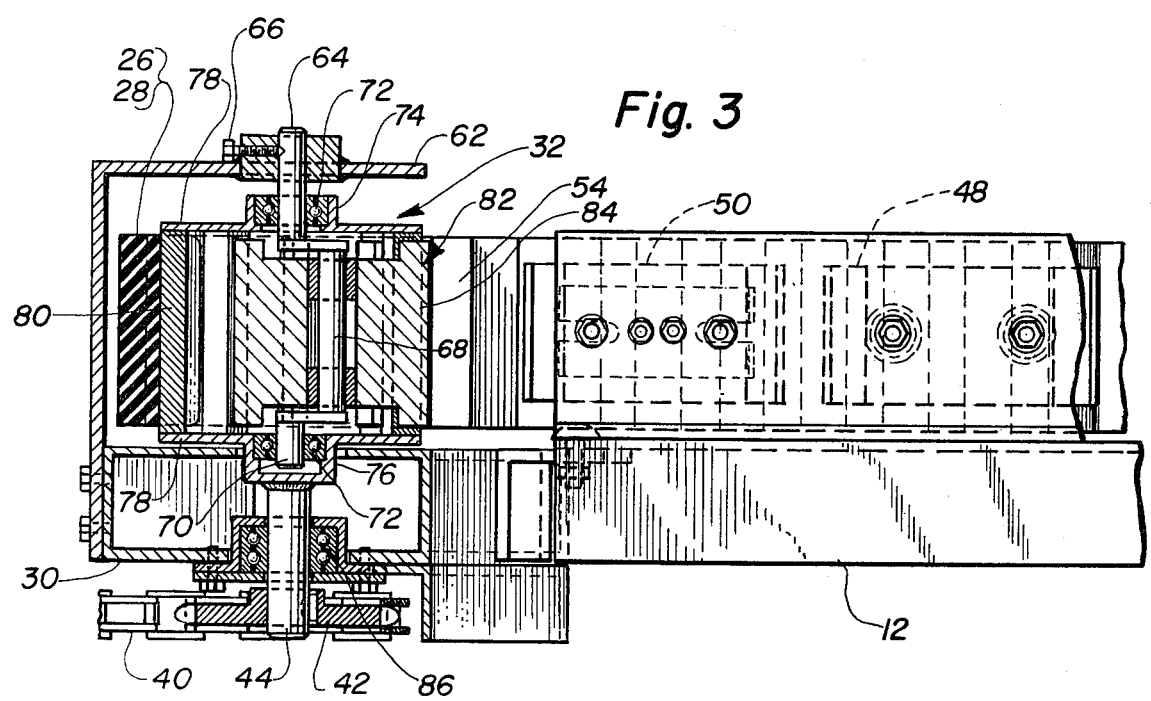
FIG. 3 is a sectional, fragmentary vertical view, taken on the line 3—3 of FIG. 2, but employing a somewhat smaller scale than used in FIG. 2, and particularly illustrating the details of the lower left corner of FIG. 2, which are shown in horizontal section.
Figure 2:
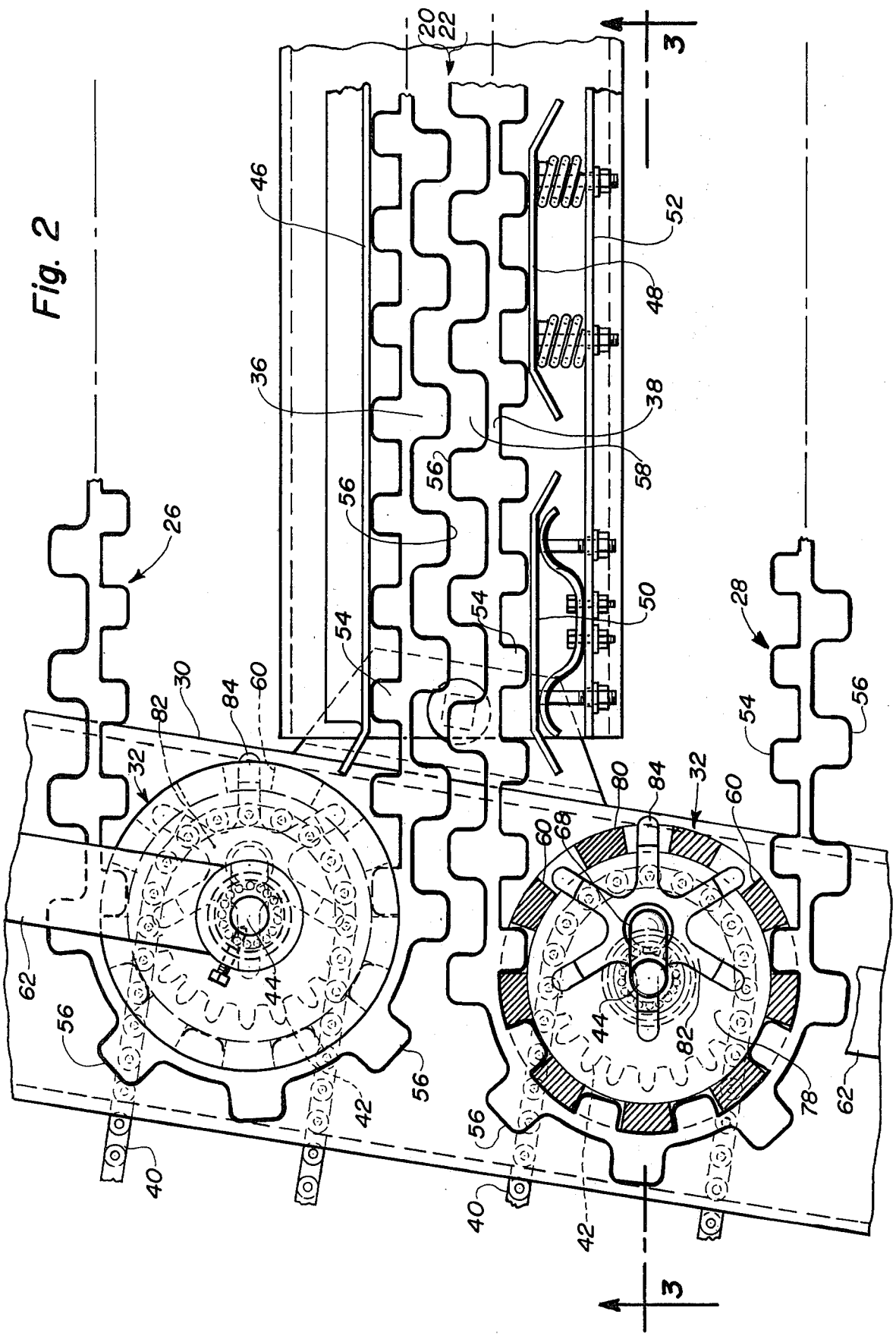
FIG. 2 is an enlarged fragmentary plan view of the portion of FIG. 1 illustrated in the broken away part of said figure on a scale suitable for clarity.

The inner end frame 12 is provided with a cross frame member 30, which is best shown fragmentarily in FIG. 2, but is also shown in FIGS. 1 and 3, said cross frame member 30 supporting rotatably a plurality of support and drive members 32, which, as best shown in FIG. 3, are drum-like and are hollow for purposes to be described. The forward portion of the frame 12 supports similar support members 34, as shown primarily in phantom in FIG. 1. The support and drive members 32 each cooperate with one support member 34 and the endless belts 26 and 28 extend around the same and therebetween for purposes of providing, as shown in FIG. 2, substantially straight crop engaging spans 36 and 38, which coact to positively and aggressively engage the crop material and feed it toward the cross frame member 30, as visualized in FIG. 2.

The rotatable support members 34 are in the nature of idlers, while the support and drive members 32 are positively driven by means of chains 40, which extend around sheaves 42, connected to one end of a short drive shaft 44, best shown in FIG. 3. It will be understood that the chains 40 are suitably connected to and driven by power means, not shown, of conventional type on a harvester of the nature to which the present invention pertains. For purposes of insuring coaction of the straight spans 36 and 38 with the crop material, one of said spans, for example, is slidable with respect to a longitudinal fixed guide member 46, shown in FIG. 2, while the opposite straight span 38 is resiliently backed up by pressure members 48 and 50 supported upon a fixed member 52 of longitudinal nature, the members 50 and 52 being slidably engaged by said straight span of the belt 38. It also will be seen from FIG. 2 that pressure members 50 and 52 are of different types respectively to illustrate possible pressure members of desired nature, but both operable similarly to provide adequate pressure upon the belt 38.

The belts 26 and 28 have similar lugs 54 on the inner surfaces and additional lugs 56 on the outer surfaces. Without restriction thereto, it will be seen that the lugs 54 and 56 respectively are of different lengths in a longitudinal direction and also may be of different heights and, further, the lugs 54 are spaced more closely with respect to each other than the lugs 56. Further, the sheaves 42 and drive means are indexed so that the lugs 56 on one straight span will be disposed opposite the recesses 58 in the opposite span and thereby afford a crenelated arrangement, which affords a very positive engagement with stalk crop material.

In general, the use of lugged belts to define feed channels in row crop harvesters is not new in a broad sense. For example, the aforementioned prior U.S. Pat. No. 3,940,913 to Wallenfang et al, shows one example of lugged belts. In said patent, the inner surfaces of the belts have lugs in the form of individual teeth, whereas in the present invention, it will be seen that the lugs actually are transverse ribs for purposes of resisting wear and providing more aggressive type of coengagement between the inner surfaces of the belts and the supporting and drive members 32. Also, in the Wallenfang disclosure, it does not appear that the tooth-type lugs on the inner surfaces of the belts coengage with any complementary recesses on the sheaves or pulleys around which the belts extend, whereas in the present invention, both the support and drive members 32 and the support members 34 are provided with slots 60 that are closely complementary in shape to the lugs 54 on the inner surfaces of the belts 26 and 28.

While the rib-like lugs 54 on the inner surfaces of the belts 26 and 28 have been found to be very effective for aggressive driving engagement with the support and drive members 32, that are power driven, it has been found that there is sometimes a tendency for the slot 60 to become clogged with debris and extraneous material encountered in the harvesting of agricultural crops and the feeding of the same to the harvester by means of the belts 26 and 28. Accordingly, one very important feature of the present invention consists in providing automatically operated anti-clogging mechanism for either the support and drive members 32 and/or the support members 34, it being understood that said members preferably are identical regardless of whether they are driven or are of the idler type. Details of the anti-clogging mechanism is as follows:

Cross frame member 30 is provided with a plurality of overhanging arms 62, which are parallel to the cross frame member, as clearly shown in FIG. 3. Said arms respectively support short shafts 64, see FIG. 3, in a fixed member by means of a set screw 66. The shafts 62 are integral with a central, laterally offset shaft 68, and the lower end thereof, as viewed in FIG. 3, also is integral with a very short stub shaft extension 70, whereby the support for the support and drive members 32 actually is a somewhat U-shaped shaft embodying short shaft 64, central offset shaft 68 and stub shaft extension 70. The short shaft 64 and stub shaft extension 70 each support bearings 72 of anti-friction nature, which respectively are seated in cylindrical formations 74 and 76, respectively fixed to circular end plates 78, the edge portions of which are suitably fixed to the cylindrical perimeter members 80, which, together with the end plates 78, form hollow rotary support and drive members 32.

It will be seen, especially from FIG. 3, that drive shaft 44 is fixed at its inner end to the cylindrical formation 76 within which one of the bearings 72 is mounted, whereby the drive shaft 44 rotatably drives the rotary support and drive members 32 for each belt 26 and 28. Further, from FIG. 3, it will be clearly seen that the rotary support and drive members 32 are hollow and are somewhat drum-like for purposes of not only accommodating the central offset shaft portion 68 of the fixed shaft means around which the rotary members 32 rotate, but also accommodates the star-shaped rotatable debris clearing members 82, which is shown in end view in the lower portion of FIG. 2, and in vertical sectional manner in FIG. 3. The debris-clearing members 82 consist of a plurality of fingers which actually comprise blades 84, which preferably are narrower than the width of the slots 60 in the hollow rotary drive members 32.

Particularly from FIG. 2, it will be seen that as the rotary support and drive members 32 rotate respectively in opposite rotary directions, as driven by the chains 40, the fingers or blades 84 of the cleaning members 82, automatically will be projected into and through the slots 60 in the cylindrical perimeter members 80 of the rotary support and drive members 32, as clearly demonstrated in FIG. 2 for purposes of punching any embedded extraneous material or debris occurring in the slot 60, due to the fact that the members 32 are supported particularly upon the central offset shaft portion 68, which are laterally offset toward the support members 34 at the outer ends of the guide channels 20 and 22, and in view of the fact that the frame 10 preferably is clear in a direction forwardly of the cross frame member 30, any of the accumulated material projected from the slot 60 will be discharged upon the ground surface over which the harvester is moving. From FIG. 3, it will be seen that the cross frame member 30 actually is somewhat box-shaped of a rectangular shape, in cross section, for purposes of rigidity. The stationary support of the upper short shafts 64, which are rigidly supported by the overhanging arms 62, provides stability around which the upper portion of each of the members 62 may revolve, whereas the drive shaft 44 connected to the lower end of member 32, as viewed in FIG. 3, is adequately supported in an anti-friction bearing 86.

From the foregoing, it will be seen that the self-clearing mechanism comprising an important part of the present invention, operates automatically with no additional power requirements and is of such nature that it readily and positively clears the slots 60 of the drive and support members 32 and/or 34 in highly efficient manner and thus, insure the accurate drive of the belts 26 and 28 by means of the lugs 54 on the inner surfaces thereof which are received in the slots 60 of the drive and support members 32 and 34, while the lugs 56 on the outer surfaces of the belts aggressively engage the cut crop material, which is fed along the guide channels 20 and 22 in a positive manner within the crenelated spaces between the outer surfaces of the coacting straight crop engaging spans 36 of said belts.

It is anticipated that aspects of the present invention, other than those specifically defined in the appended claims, can be obtained from the foregoing description and the drawings.

Having thus described the invention, what is claimed is:

1. A row crop harvester comprising a mobile frame having a forward end portion, a cutterhead on the forward portion of said frame, means defining elongated crop receiving paths extending rearwardly from said cutterhead to guide cut crop material rearwardly therefrom, at least partially parallel guideways extending along opposite sides of said paths, pairs of coacting endless configurations on the outer surfaces positive crop engaging configurations on the outer surfaces thereof and spaced drive lugs on the inner surfaces thereof, the belts respectively having substantially straight crop feeding spans thereon movable along opposite sides of said guideways to receive and engage crop material between said spans, pairs of rotary belt support and drive members mounted respectively adjacent opposite end portions of said paths and around which said belts extend, power means connected to one drive member of each pair of belt supports, complementary co-engaging configurations on the surfaces of said rotary members receiving said drive lugs on said belts to effect positive drive of said straight spans of the belts, and self-cleaning members for said complementary configurations of said rotary members mounted adjacent the same and operable to clear said configurations of any extrameous material accumulated therein.

2. The harvester according to claim 1 further characterized by said rotary members having cylindrical perimeters and said complementary means thereon comprising openings extending through said perimeters of said members and into which said drive lugs extend for driving engagement by said members, and said self-cleaning means engaging said openings to clear the same as aforesaid.

3. The harvester according to claim 2 in which said cylindrical perimeters of said rotary members define a hollow interior within which said self-cleaning means are supported.

4. The harvester according to claim 3 further characterized by said self-cleaning means comprising toothed cleaning members rotatably supported within said hollow rotary members and on which the teeth of said members are circumferentially spaced similarly to the spacing of said openings in the perimeters of said rotary members and are operable to project into said openings to free the same of any extraneous material lodged therein.

5. The harvester according to claim 4 in which said rotary members are rotatable about axes fixed relative to said mobile frame and said toothed cleaning members being supported for rotation upon stationary axes offset laterally from the axes of said rotary members in a direction toward the opposite rotary member for each belt.

6. The harvester according to claim 5 in which the radial length of said fingers is no greater than the radius of the interior of said cylindrical perimeters of said rotary members.

7. The harvester according to claim 5 further including a support shaft for each rotary member having opposite ends in axial alignment and the intermediate portion of each shaft being offset laterally for free rotary support of said toothed cleaning members, said ends of each shaft having bearings thereon, said rotary members having end plates connected at the edges to said cylindrical perimeters thereof and having central openings surrounding said bearings on said ends of said shafts, means fixedly connecting one end of said shaft non-rotatably relative to said frame of said harvester, and drive means connected to one of the end plates of one of the rotary members of each pair thereof to effect driving of said belts by said one rotary member.

8. The harvester according to claim 1 in which said endless feed members are flexible belts and the crop engaging means on the outer surfaces of said belts comprising lugs spaced even distances therealong with spaces evenly between the lugs, and the belts of each pair being arranged with the lugs on the crop feeding spans of one belt being opposite the spaces between the lugs on the opposite crop feeding span on the other belt.

9. The harvester according to claim 8 further characterized by said crop engaging lugs being of slightly less width than the width of the spaces between said lugs.

10. The harvester according to claim 9 further characterized by said crop engaging lugs having blunt outer ends and said spaces therebetween being substantially rectangular in cross-section for rugged durability and effective gripping of crop material between said belts.

* * * * *